May 1, 1956     F. W. BARBKNECHT ET AL     2,743,569
COTTON PICKER DRUM STRUCTURE WITH LUBRICATING MEANS
Filed March 4, 1954
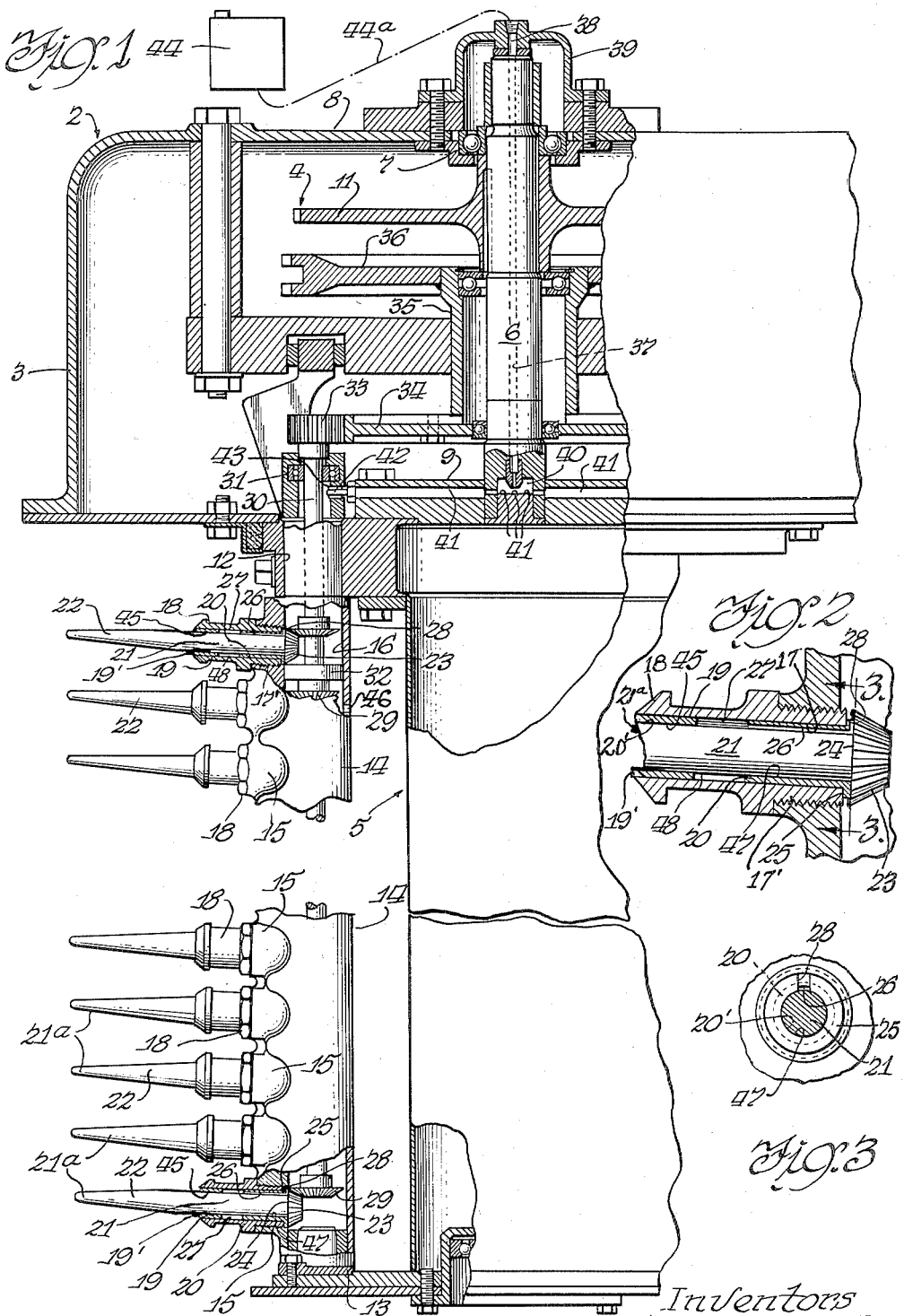
Inventors
Fred W. Barbknecht & Delos A. Walker
Paul O. Pippel Atty.

United States Patent Office 2,743,569
Patented May 1, 1956

2,743,569

COTTON PICKER DRUM STRUCTURE WITH LUBRICATING MEANS

Fred W. Barbknecht, Palos Heights, Ill., and Delos A. Walker, Memphis, Tenn., assignors to International Harvester Company, a corporation of New Jersey Application March 4, 1954, Serial No. 414,196

3 Claims. (Cl. 56—44)

This invention relates to a novel means for lubricating cotton picker spindles in current production machines of the type shown in U. S. Patent 2,140,631.

Various attempts have been made to properly lubricate cotton picker spindles, these including metering devices and conducting grooves and the like, but to date no successful simple system had been found.

A general object of the invention is to provide a simple lubrication method which positively insures lubrication of all the picker spindles.

A further object of the invention is to provide a method for lubricating such cotton picker spindles which not only lubricates the spindles, but also flushes the dirt from the spindle bearings.

Another object is to devise a novel arrangement of bearings for retaining lubricant at the spindles.

These and other objects of the invention will become more apparent from the specification and the drawings, wherein:

Figure 1 is an elevational view of the conventional cotton picker drum with parts broken away and shown in section;

Figure 2 is an enlarged fragmentary view of the uppermost spindle and bearing assembly shown in Figure 1; and Figure 3 is a section on the line 3—3 of Figure 1.

In the drawings there is shown a conventional cotton picker, generally designated 2, comprising an upper drum head housing 3 within which is contained the drive mechanism, generally indicated 4, for the picker drum 5, said mechanism including a shaft 6 carried on a bearing 7 from the upper wall 8 of the head portion 3, the shaft being connected at its lower end to the upper end or cap 9 of the picker drum 5. The shaft 6 is driven by a sprocket 11 keyed thereto. The drum provides a peripheral oscillatory support, as at 12 and 13, for the upper and lower ends of a hollow, vertical support picker bar or tube 14. It will be understood that there are thirteen to fifteen such bars in the present pickers. Each bar or support 14 is provided with a vertical series of generally horizontal hollow hubs or holders 15, each of which opens into the internal bore 16 of the tube. The hubs are internally threaded and each receives a cylindrical threaded nut portion 17' therein of a nut 18, the nut having a generally horizontal bore 17 therein into which are socketed axially spaced cylindrical outer and inner bushings 19 and 20 through which journalled a cylindrical bearing surface 20' on a shank portion 21 of a picker spindle 21a. The outer end of the shank portion is continued into a picker cone 22 and the inner end is provided with a bevel gear 23 which bears at its outer side 24 against an outturned flange 25 on the inner end of the bearing 20. The bearing 20 has at least one longitudinal groove 26 positioned in the upper side of its inner periphery or bore and communicating at the outer end of bearing 20 with an annular reservoir chamber 27 defined by the internal periphery of the nut between the outer end of the bearing 20 and the inner end of bearing 19 which is axially outwardly spaced therefrom. This groove 26 may, of course, be formed in the internal periphery 17 of the nut 18 and open to bore 16 at one end and to reservoir 27 at the other end. The inner end of the groove or conduit means 26 is connected to the lower end of a radial groove 28 in flange 25 which extends upwardly from groove 26 and at its upper end communicates with the bore 16 of the support bar.

The bevel gears 23 are driven from companion bevel gears 29 connected to a shaft 30 which extends through the bore 16 and mounted in a plurality of bearings 31 and 32. The shaft 30 is provided with a spur gear 33 at its upper end driven by a gear 34 which is connected to a sleeve 35 which is sleeved over the shaft 6 and connected to a driving sprocket 36.

The oiling system for the above-described picker comprises coaxial passages 37 and 38 in the shaft 6 and the cap 39 which covers the upper end of the shaft. The lower end of the shaft passage 37 communicates with a chamber 40 which is recessed into the upper end wall 9 of the picker drum and communicates with a plurality of radial passages 41 in the wall 9, each of which terminates in a nozzle 42 which projects into a slot 43 in the upper end of a related picker bar and discharges into the interior of the bar.

The invention is directed to a novel method of oiling the spindles which has been proved by extensive tests. This method comprises filling the container 44 with lubricating oil, the container being high enough or pressurized so that it drains through the conduit 44a, the passages 38, 37 into the chamber 40 and from there through the passages 41 and the nozzles 42 into the bores 16 of the picker bars until all of the bars are filled to overflowing. The oil flows through the grooves 28, 26 in the bearings 20 into the reservoir chambers 27 and the excess seeps out between the internal continuous cylindrical bore surface 45 of the outer bearings 19 from its outer end 19' and the cylindrical periphery of the shank portion of the related picker spindle. The oil may be heated in order to lower its viscosity so that it will flow easily and more readily flush the bearings of dirt which is forced outwardly. Each bar has a vent hole 46 provided in its upper end.

The picker is preferably run before oiling in order to heat the parts, that is, the bearings 19 and 20 and the associated spindle shank in order to expand the same. Normally after the initial oiling, the machine is run all day, and at night during an idle period when the parts are hot, the oil is poured into the picker bars. The heated parts reduce the clearances between the bores of the bearings and the spindle shanks whereby oil is prevented from readily flowing out, but is contained in the bars so that they may be easily filled. As the parts begin to cool by being subjected to room or atmospheric temperatures, the oil is gradually drained out of the picker bars by the contraction of the bearings and the spindles which enlarge the clearances therebetween whereby the oil flows out and flushes each bearing of dirt and the like. The instant oiling system further provides for the lower spindles to receive the most extensive flushing in that as the oil level drops, it leaks out of the spindle holders below its level. This is extremely important in that the lower spindles and bushings were always subject to the greatest wear whereas in the instant oiling system, the extended flow of the oil through these lower spindles insures absolute flushing and cleanliness and materially improves their life extent. Furthermore, the spindle bearings with the most wear provide the greater clearance and thus receive the greater flow of oil therethrough. The picker is left overnight to permit the oil to drain out and then used the following day without oiling. It will be noted that inasmuch as the bottom portion of each bearing 20 is provided with an uninterrupted bearing surface 47 and one end thereof and the adjacent end of the bearing 19 provides a well 48 at the bottom of each chamber 27 which holds a small pool of oil which is adapted to splash onto the spindle during operation as the machine is being operated and intermittently deposit a film of oil which through centrifugal and capillary and gravitational action is carried to the surfaces 45 and 47. Then at night, immediately after completing the day's work, the picker bars are again flooded with oil and this cycle is continued throughout the entire picking season.

In the initial lubrication, the method requires that the cold drums be oiled by flooding the bars and after running for a time sufficient to heat the parts, the bars are again flooded and the oil allowed to drain whereupon the machine is ready for operation and at night or when operation is terminated for the day, again lubricated as before specified.

Alternatively the porous bearings 19 and 20 which are made of sintered powdered metal may be immersed in oil which is heated to a temperature of about 150 F. for a period sufficient to impregnate them with the oil usually about 15 to 20 minutes. These bearings so treated if directly assembled in the machine will provide sufficient lubrication for one day of operation whereupon the method heretofore discussed is employed.

What is claimed is:

1. In a cotton picker machine of the type having a drum including a plurality of upright hollow support bars, each bar having an upright bore with a closed lower end, and a vertical row of generally horizontal cylindrical lubricant-permeable bearing means on each bar, each bearing means having an inner end communicating with the bore of the associated bar and having an outer end, and a spindle rotatably mounted in each said bearing means, a lubrication system for said bearing means comprising a reservoir for containing a supply of lubricant and a free flowing conduit connection between said reservoir and the bore of each of said bars whereby a quantity of lubricant may be introduced into the reservoir during an idle period of the machine sufficient to simultaneously fill the bores of all of said bars so as to cause lubricant in the bores to migrate therefrom through all of the bearing means of the entire vertical row communicating therewith whereby to permeate all of said bearing means and flow through said bearing means out of their outer ends and thus flush out dirt and the like therefrom.

2. The invention according to claim 1 and said bearing means being made of sintered powdered metal and comprising a pair of axially spaced portions defining with an adjacent portion of the bar a reservoir chamber therebetween communicatively connected with the bore and adapted to retain therein a portion of the lubricant flowing through the bearing means in a direction out of the outer end thereof.

3. In a cotton picker of the type embodying a picker drum which includes an upright hollow support tube with a vertical bore having a closed lower end, a vertical row of generally horizontal spindle holders connected to the tube and a pair of inner and outer axially spaced porous bearings mounted in each holder and defining a lubricant chamber therebetween and each bearing having a cylindrical internal surface and the inner bearing having an upper portion with a passage communicating at one end with the bore and at the other end with the associated chamber, and a spindle extending out of each holder and having a cylindrical surface complementally journaled on said internal surfaces of the associated pair of bearings with a running clearance therewith providing lubricant seepage spaces, a system for lubricating said bearings comprising means including free flowing conduit means connected to said bore and adapted to receive during an idle period of the machine a quantity of lubricant to entirely fill the bore from top to bottom thereof so that the lubricant is caused to simultaneously flow through said passages of all of said inner bearings and fill said chambers between each pair of bearings and the excess lubricant is caused to permeate the bearings and flow along said seepage spaces in a direction outwardly from said bore to flush the bearings.

References Cited in the file of this patent

UNITED STATES PATENTS

| 2,467,722 | Baker | Apr. 19, 1949 |
| 2,593,671 | Hagen et al. | Apr. 22, 1952 |